(12) United States Patent
Olschok et al.

(10) Patent No.: US 10,905,980 B2
(45) Date of Patent: Feb. 2, 2021

(54) FILTER DEVICE, HYDRAULIC SYSTEM AND BACKWASHING METHOD

(71) Applicant: HYDAC PROCESS TECHNOLOGY GMBH, Neunkirchen (DE)

(72) Inventors: Markus Olschok, Neunkirchen (DE); Christian Schindler, Schiffweiler (DE); Seddik Lahbib, Forbach (FR)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 223 days.

(21) Appl. No.: 15/532,657

(22) PCT Filed: Aug. 27, 2015

(86) PCT No.: PCT/EP2015/001746
§ 371 (c)(1),
(2) Date: Jun. 2, 2017

(87) PCT Pub. No.: WO2016/087011
PCT Pub. Date: Jun. 9, 2016

(65) Prior Publication Data
US 2017/0333816 A1 Nov. 23, 2017

(30) Foreign Application Priority Data

Dec. 3, 2014 (DE) .................. 10 2014 017 860

(51) Int. Cl.
*B01D 29/66* (2006.01)
*B01D 29/90* (2006.01)
(Continued)

(52) U.S. Cl.
CPC .......... *B01D 29/668* (2013.01); *B01D 29/35* (2013.01); *B01D 29/48* (2013.01); *B01D 29/906* (2013.01); *B01D 35/16* (2013.01); *B01D 2201/02* (2013.01)

(58) Field of Classification Search
CPC .... B01D 29/668; B01D 29/906; B01D 35/16; B01D 29/48; B01D 29/35; B01D 2201/02
See application file for complete search history.

(56) References Cited

U.S. PATENT DOCUMENTS 1,438,983 A * 12/1922 Collin ................. B01D 27/00
                210/426
1,467,464 A * 9/1923 Wesson ................. F16K 1/02
                251/276

(Continued)

FOREIGN PATENT DOCUMENTS

DE   27 54 594   6/1979
DE   32 47 440   7/1984
(Continued)

OTHER PUBLICATIONS

Schultz-DE-2754594 (machine translation and original attached) (Year: 1977).*

(Continued)

*Primary Examiner* — Liam Royce
(74) *Attorney, Agent, or Firm* — Wenderoth, Lind & Ponack, L.L.P.

(57) ABSTRACT

A filter device (10) includes a filter element (12) in a filter housing (14) with fluid connection points (16, 18) for the non-filtrate and filtrate. Fluid can be passed through the filter element in both directions for filtrating the non-filtrate or for backwashing for cleaning particle contaminations (72). A pressure control (36) generates a post-suctioning effect to improve the cleaning of the particle contaminations (72). The filter device (10) is designed as a one filter-element solution. In a predetermined exchange, the single filter element (12) for filtering can be used for backwashing or can be backwashed using the pressure control device (36). A (Continued)

hydraulic system (64) and a method for backwashing a filter element (12) of a filter device (10) is provided.

29 Claims, 3 Drawing Sheets

(51) Int. Cl.
*B01D 29/48* (2006.01)
*B01D 35/16* (2006.01)
*B01D 29/35* (2006.01)

(56) References Cited

U.S. PATENT DOCUMENTS

| | | | | |
|---|---|---|---|---|
| 1,500,820 A | * | 7/1924 | Jones | F16K 1/44 137/424 |
| 2,024,753 A | * | 12/1935 | Zwicky | B01D 35/16 210/106 |
| 3,394,812 A | * | 7/1968 | Cohen | B64F 1/36 210/134 |
| 3,542,676 A | * | 11/1970 | Colburn | B01D 33/11 210/380.1 |
| 2010/0276356 A1 | | 11/2010 | Wnuk et al. | |
| 2012/0228239 A1 | | 9/2012 | Wnuk et al. | |

FOREIGN PATENT DOCUMENTS

| | | |
|---|---|---|
| DE | 10 2007 054 737 | 5/2009 |
| FR | 2 513 537 | 4/1983 |
| WO | 2009/062644 | 5/2009 |

OTHER PUBLICATIONS

International Search Report (ISR) dated Jan. 7, 2016 in International (PCT) Application No. PCT/EP2015/001746.

* cited by examiner

US 10,905,980 B2

FILTER DEVICE, HYDRAULIC SYSTEM AND BACKWASHING METHOD

FIELD OF THE INVENTION

The invention relates to a filter device comprising a filter element, which is accommodated in a filter housing with fluid connection points for the non-filtrate and filtrate. Fluid can be passed through the filter element in both directions for filtrating the non-filtrate or for backwashing for cleaning particle contamination. The filter device also comprises a pressure control device, by which a post-suctioning effect can be generated to improve the cleaning of the particle contamination on the filter element to be backwashed. The invention furthermore relates to a hydraulic system with such filter device and a method for backwashing a filter element of such filter device.

BACKGROUND OF THE INVENTION

Such filter devices are known in the prior art, for example, from document WO 2009/062644 A1. In this filter device, a plurality of filter elements are disposed offset relative to one another on a pitch circle. A device is provided to backwash a respective one of these filter elements, while the other filter elements allow continued filtering of fluid that flows through the device accordingly for this purpose. For the backwashing, a pressure control device is guided over a filter element and at the same time a backwash arm is guided under the filter element. The closing of the filter element intake by a plate valve of the pressure control device permits generating a back flow of filtrate through the filter element, which back flow results in the contamination that has accumulated on the filter element being able to be backwashed and flushed out of the device by the backwashing arm. In spite of the large quantities of input fluid to be moved inside this large device for its operation as described above, there is in any case always sufficiently high pressure available on the filtrate side of the filter element to allow the backwashing to be realized. This backwashing effect is additionally increased in that, by the blocking element of the pressure control device in the form of the plate valve, the filter element intake can be promptly shut off so that a type of pressure shock with an improved cleaning effect is generated on the respective filter element to be backwashed.

In practice, there is often a desire to be able to install such backwashable filter devices not only in large hydraulic systems, such as marine gear units or hydraulic presses, for example, but also to use them for smaller machines and mechanical equipment, for example in the field of machine tools. This desire calls for a significantly more compact construction. However, the size of the effective filter element surfaces to be used cannot be significantly reduced, because otherwise the particle pollution of the fluid to be filtered would rapidly result in blocking and thus premature replacement of the old filter elements with new filter elements, which blocking and replacement compromises the efficiency of the filter device.

SUMMARY OF THE INVENTION

The problem addressed by the invention involves providing an improved filter device and a hydraulic system that can be more compact in construction and that additionally allow improved backwashing for the filter element to be cleaned. Furthermore, an efficient method for backwashing the filter element of such filter device should be provided.

This problem is solved by a filter device, by a hydraulic system and by a method for backwashing a filter element of such filter device according to the invention.

In accordance with the invention, a filter device is obtained where the filter device is formed as a single filter element solution. In a predefinable changeover, this single filter element can be used for filtration or can be backwashed by using a pressure control.

The filter device according to the invention thus comprises only a single filter element inside an element or filter housing. For this reason alone, it can be designed to be very space-efficient with regards to its construction. This backwashable filter device can be set up and installed in a space-saving manner, in particular in the region of machine tools, such as turning-, drilling- or milling machines. In particular, the machining of work pieces often involves significant particulate contamination of lubricating-, cooling- and hydraulic fluids, each of which can be reliably and also cost-effectively cleaned with the filter device, with the filter element used having a particularly long service life due to time-based or demand-based backwashing. The separation rate is very high due to the use of proven-quality, tough filter element technology. In addition, a particularly high fluid pressure for the non-filtrate at the fluid connection point is not required to be able to nonetheless reliably filter the fluid and to trigger a backwashing.

By contrast with the above-described, known solution, the maximum possible fluid input quantity is significantly reduced in the single filter element solution, since only a smaller quantity of fluid can necessarily be accommodated between the outer side of the only one filter element and the inner wall of the only one filter housing, which in this respect surrounds the filter element with a predefinable wall distance. Because the filter element usually has to clean fluids with a relatively high viscosity, such as hydraulic oil, for example, advantageously for the acceleration of the fluid in the backwashing only a small input amount is available, which fluid amount has to be post-suctioned by appropriate activation by the pressure control. This post-suctioning ensures that, in spite of the relatively high viscosity of the fluid, which viscosity forms a natural resistance in the backwashing. The input quantity in the backwashing is kept at low levels, and has, due to the post-suctioning effect, a high return flow velocity. This high velocity permits in a pulsed and thus highly effective manner a cleaning of the particulate contamination from the filter element surface on the non-filtrate compartment side of the filter element. No equivalent of this system exists in the prior art.

In the presented, known solution, the total fluid input quantity stored in the filter housing is, with respect to the plurality of inserted filter elements, so high that, due to the viscosity thereof, a very high flow resistance is produced, which resistance must be overcome before the post-suctioning effect produced by the pressure control in the backwashing can even commence. Furthermore, due to the attachment of the fluid or oil components to one another, the desired throughput volume in the backwashing is also significantly reduced, which reduction necessitates frequent and long-lasting backwashing cycles. This situation is precisely what the solution according to the invention avoids. In principle and from an overall effectiveness perspective, the fact that the filtration and backwashing operations never take place simultaneously with the single element solution according to the invention, but rather consecutively, plays only a minor role.

By the obvious connection of several single filter element solutions to one another, these filter elements can be combined in a space-saving manner to thus still ensure a continuous filtration operation with a section of the single filter elements, while the other section of the single filter elements is additionally backwashed. The backwashing has a significantly improved post-suctioning effect because, despite the thus increased total fluid input quantity for all of the single filter elements used, these single filter element devices are however divided into "small packages", which can be applied with a greater cleaning effect to the output side of the respective filter element for particle contamination in a relatively resistance-free manner and therefore promptly. Because the single filter element solutions can be placed at different installation locations spatially separated from one another, but connected to one another in a fluid-conveying manner, the overall performance of an individual device with several filter elements, of the kind presented for example in WO 2009/062644 A1, can also easily be realized in a space-saving manner by the single element solution, which will come as a surprise to the average person skilled in the art of filtration technology.

In a particularly advantageous manner, the fluid connection points for non-filtrate and filtrate are arranged in a head piece of the filter housing and are connected to one another by the filter element. A first fluid-conveying path between the non-filtrate connection point and an input side of the filter element can be at least partially shut off by a displaceable blocking part of the pressure control. These features make a compact construction of the filter device. The shutting off of the first fluid-conveying path by the blocking part in multiple steps provides different effects in the individual stages of the backwashing operation. If the blocking part of the pressure control begins to move from its fully opened position to its closed position, the blocking part initially reduces the free inflow cross section to the inside of the filter element. The blocking part thus forms with its associated valve seat on the filter housing a kind of nozzle or restriction point, by which the fluid flow towards the output side of the filter element for particle contamination is accelerated. This restriction point results in an axial flow accelerated towards this output side of the filter element. The non-filtrate at least partially present on the inside of the filter element draws the particle contamination found on the inner wall side off the walls of the filter element. If, from a fully opened position of the blocking part or in any case shortly before it contacts on the valve seat, the blocking part is closed by the pressure control in a very rapid manner, preferably in a sudden manner. This rapid closure results in a pressure surge involving the backwash lines or discharge lines connected to the filter element on the output side. The cleaned fluid in the filtrate compartment of the filter housing then passes in an accelerated manner from the outside to the inside through the wall of the filter element, and thus, then further cleans away any particle contamination still remaining on the inner side of the filter element.

The first fluid-conveying path can extend in the head piece at an angle, preferably at a right angle, at a diversion point. The blocking part can be moved in the diversion out of a releasing opened position or starting position towards its closed position along a guide, which separates the fluid connection points for non-filtrate and filtrate from one another. The guide can be partially formed as a wall extending vertically inside the installed, operational device. The right-angled formation of the diversion has the advantage that the pressure control can be arranged directly above the filter element in or on the head piece. For example, the blocking part can be moved in the head piece by an actuating rod of an actuator attached to the head piece of the filter device. In addition, in every displacement position of the blocking part, its wall guide ensures that fluid supplied to the filter device on the non-filtrate side via the fluid input point under relatively high pressure, which in this respect contacts the blocking part that may be closing or opening, does not adversely affect the function of the blocking part or the free displacement movement of the blocking part. In particular, it ensures that there are no constraints on the free displacement movement of the blocking part.

The filter element advantageously extends between two fluid-conveying receptacles inside the filter housing and transitions into these receptacles. One receptacle is connected to the first fluid-conveying path, while the other receptacle is connected to a second fluid-conveying path in the form of a backwash line. The backwash line extends out of the filter housing on the output side of the filter element for the particle contamination and can be activated by a backwash valve, in particular a 2/2-way valve. Due to the receptacles, the filter element is fixed in the filter housing in a secure and pressure-resistant manner also with respect to pressure change loading and has defined transition points for the filtrate-non-filtrate guiding. Because the second fluid-conveying path can be shut off by the backwash valve, this arrangement ensures that, during the filtration operation, the fluid to be cleaned makes it from the non-filtrate side in the filter element to the filtrate side or clean side of the filter device and that, during the backwashing operation, the inside of the filter element is in a fluid-conveying connection with the backwash line, by which the particle contamination to be cleaned is finally discharged from the filter device.

A third fluid-conveying path extends between the pressure control and the backwash valve in a straight line, in particular along a longitudinal axis of the filter element thus forming a kind of freefall line. Such a straight line extension of the third fluid-conveying path is also of critical importance for the effectiveness of the backwashing because the generation of the post-suctioning effect depends on the kinetic energy of the moved fluid quantity in the third fluid-conveying path and in the connected second fluid-conveying path. The available energy is determined by the formula $$W = \frac{m}{2}v^2 \quad (1)$$

This relationship means that the higher the mass m and the velocity v of the flowing fluid, the greater is the energy W available for the generation of the post-suctioning effect, and the better is the backwashing result. Whereas, in the case of the known filter devices, the moved fluid quantity in the region of the second comparably fluid-conveying path is diverted from a filter element arranged eccentrically relative to the longitudinal axis or activation axis of the device to a valve arranged centrically relative thereto, which involves energy loss. In the solution according to the invention, the kinetic energy of the fluid flow is, due to the straight-line extension of the second and third fluid-conveying path, available in an undiminished form for generation of the post-suctioning effect. In a first step with a partly closed blocking part, the fluid located on the inside of the filter element is regularly axially accelerated in the form of non-filtrate, and thus, flowing, parallel to the inner walls of the filter element carries away the particle contamination from the filter element towards the output side. With a fully closed blocking part, the actual operation of post-suctioning of cleaned fluid is then from the filtrate side of the filter element to its non-filtrate side on the inside. The clean filtrate then enters the filter element mostly in a radial direction for a cleaning of the particle contamination transverse to the longitudinal alignment of the filter element. As a consequence of this freefall effect, this cleaning operation is also accelerated. The fluid input quantity present in the filter housing on the clean side thereof mainly then serves as the available backwash quantity that enters the filter element for the cleaning operation from the outside to the inside in an almost resistance-free manner even in the case of high viscosity.

Particularly advantageously in this regard is that the volume existing on the inside of the individual filter element combined with that of the second fluid-conveying path in the form of the backwash line is sufficiently large that, by the displacement of the blocking part of the pressure control into the closed position, after a closure thereof that preferably occurs rapidly, a pressure shock is generated on the filter element to bring about the backwashing. For this purpose, the respective free fluid cross sections A of the filter element and of the second fluid-conveying path can either be dimensioned correspondingly large and/or their length l can be dimensioned sufficiently long. The generally applicable formula for flowing fluids $$m = \rho V = \rho A l = \rho \int A \, dl \qquad (2)$$

means that, in the case of assumed constant density p of the fluid moved inside the filter housing for the backwashing with an increasing volume V, in other words, depending on the cross sections A and the length l of the second and third fluid-conveying paths flowed through with the fluid, the mass m of the fluid to be discharged on the output side increases. The energy W of the fluid to be activated that is available for the backwashing increases accordingly according to the equation (1). The fluid available for the backwashing is made up of the non-filtrate quantity from the previous filtration process, which is initially still located on the inside of the filter element and which correspondingly flows back up until the full closure of the blocking part on the inlet side of the filter device. The subsequent chamber quantity of filtrate between the outer side of the filter element and the inner side of the filter housing and, if appropriate, a predefinable back-flow quantity of filtrate, already carried out onto the outlet side or clean side of the filter device, can still flow back towards the filtrate compartment. This process can also be activated on the outlet side or clean side by a corresponding valve control device, which is preferably in operative connection with the pressure control.

If the backwash valve is opened and the backwash line is formed as a downpipe with a correspondingly large line length, preferably with vertical guidance, the post-suctioning effect or pressure shock effect is further increased during backwashing of the single filter element. By contrast with the solutions in the prior art, multiple diversions exist in the backwash guidance and line guidance on the output side for the particle contamination. Due to the downpipe design according to the invention, the fluid quantities to be moved are accelerated in the backwashing due to gravity, which further improves cleaning performance.

The filter element can be formed conical, preferably in the form of a slotted sieve tube, and accommodated in a pot-shaped receiving part of the filter housing in such a way that, with increasing tapering of the filter element, the filtrate compartment formed in the receiving part and surrounding the filter element widens. This arrangement results in optimal flow conditions both for the filtration and for the backwashing, because the cross sections then increasingly widen on the inside of the filter element towards the second fluid-conveying path and outside of the filter element towards the fluid connection point for the filtrate.

The tapered extension advantageously produces during the backwashing an isokinetic flow course inside the conical filter element towards the backwash line in the case of an opened backwash valve. This isokinetic flow course ensures that a uniform post-suctioning effect is generated over the entire length of the filter element. The filter element is then backwashed to a greater extent, not only in one region, for example at the end, but over its entire length, so that the particle contamination attached to the inner side of the filter element is uniformly carried off or flushed out. The single element solution is then again available for filtration with full dirt collecting capacity, for which purpose the backwash valve is to be closed and the blocking valve of the pressure control device is to be opened, preferably up to its maximum opened position.

The pressure control has a drive system, preferably in the form of a pneumatically-activatable working cylinder. The blocking part of the pressure control is plate-shaped or saucer-shaped with a reduced mass. Using a pneumatically-controllable working cylinder, the blocking part can be displaced quickly, that is to say, in a sudden manner from its maximum opened position to its fully blocking closed position and vice versa. In particular, when the filter element inserted into the filter device is formed of a slotted sieve tube made of solid metal materials, a powerful pressure shock can be generated thereon without the filter element being damaged by the pressure shock. Thanks to the afore-mentioned plate- or saucer-shaped formation of the blocking part, in a reliable manner, large cross sections of the fluid-conveying paths can be handled in the region of the non-filtrate inlet of the filter element. Even when the fluid on the non-filtrate side has significant particle contamination and even in the form of large particles, effective cleaning can take place.

The invention furthermore relates to a hydraulic system with such filter device. A tank is connected to the fluid connection point of the filter device for the filtrate at the output side. The tank acts as a compensation device or buffer to compensate for variations in the fluid flow subsequent to the filter device caused by a discontinuous supply of filtrate, owing to the respective required backwashing. A tank with sufficiently large dimensions ensures a continuous supply of a machine with filtered fluid, which machine is situated downstream when viewed in the fluid flow direction and which is, together with the filter device, a component of a hydraulic supply circuit.

The invention additionally relates to a method for backwashing a filter element of such a filter device comprising the steps:

a) opening the backwash valve to establish a fluid-conveying connection from the inside of the filter element to the backwash line;

b) allowing the non-filtrate to flow through the filter element and into the backwash line;

c) displacing the blocking part of the pressure control device into the blocking position to generate a stall of the fluid flow in such a way that a suction effect is produced, which effect sucks filtrate from the filtrate compartment from the outside to the inside through the filter element to remove contamination from the filter element;

d) displacing the blocking part into the opened position for flushing the inside of the filter element with non-filtrate; and e) closing the backwash valve.

In one advantageous embodiment, the blocking part remains in the blocking position for the backwashing operation for a maximum of 2 seconds, preferably for a maximum of 1 second, and still more preferably for a maximum of 0.5 seconds, and then returns back to its maximum opened position for the rest of the filtration process.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
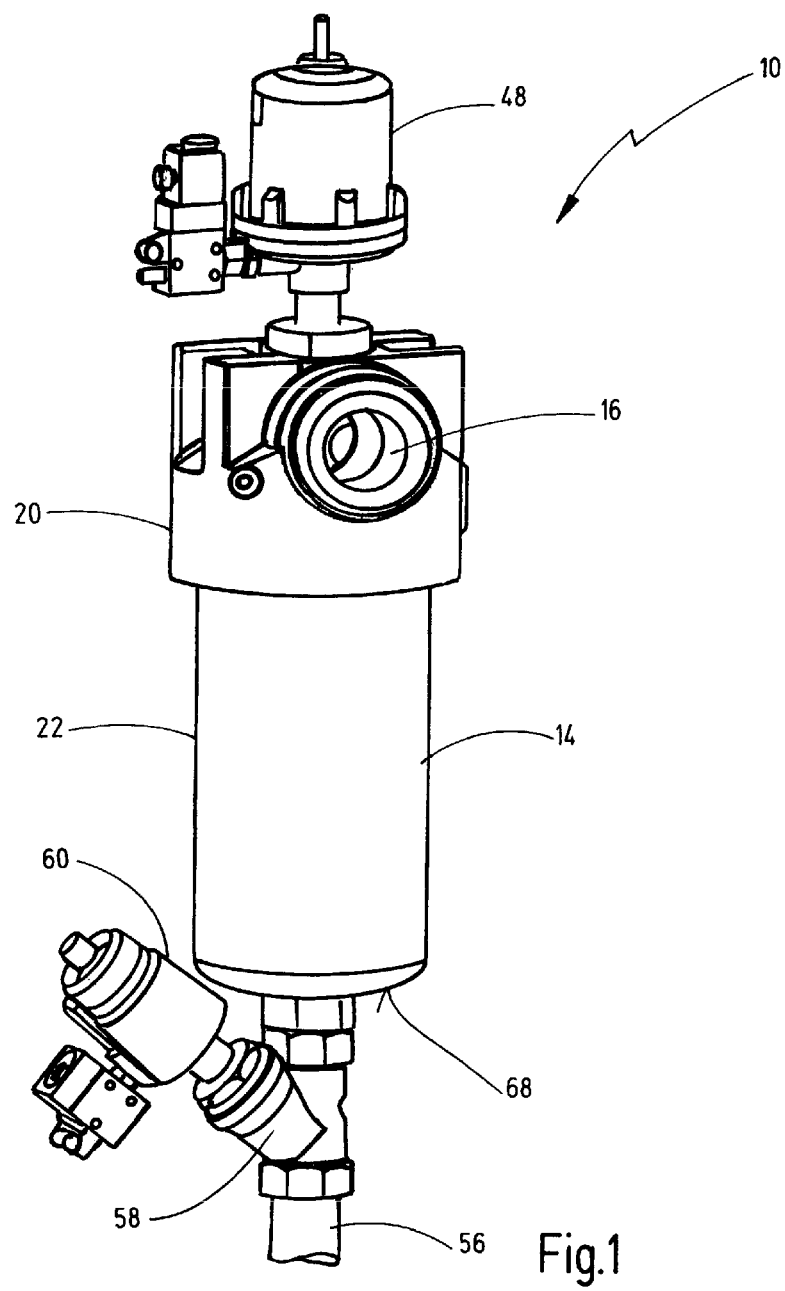
FIG. 1 is a perspective side view of the filter device according to an exemplary embodiment of the invention.
Figure 2:
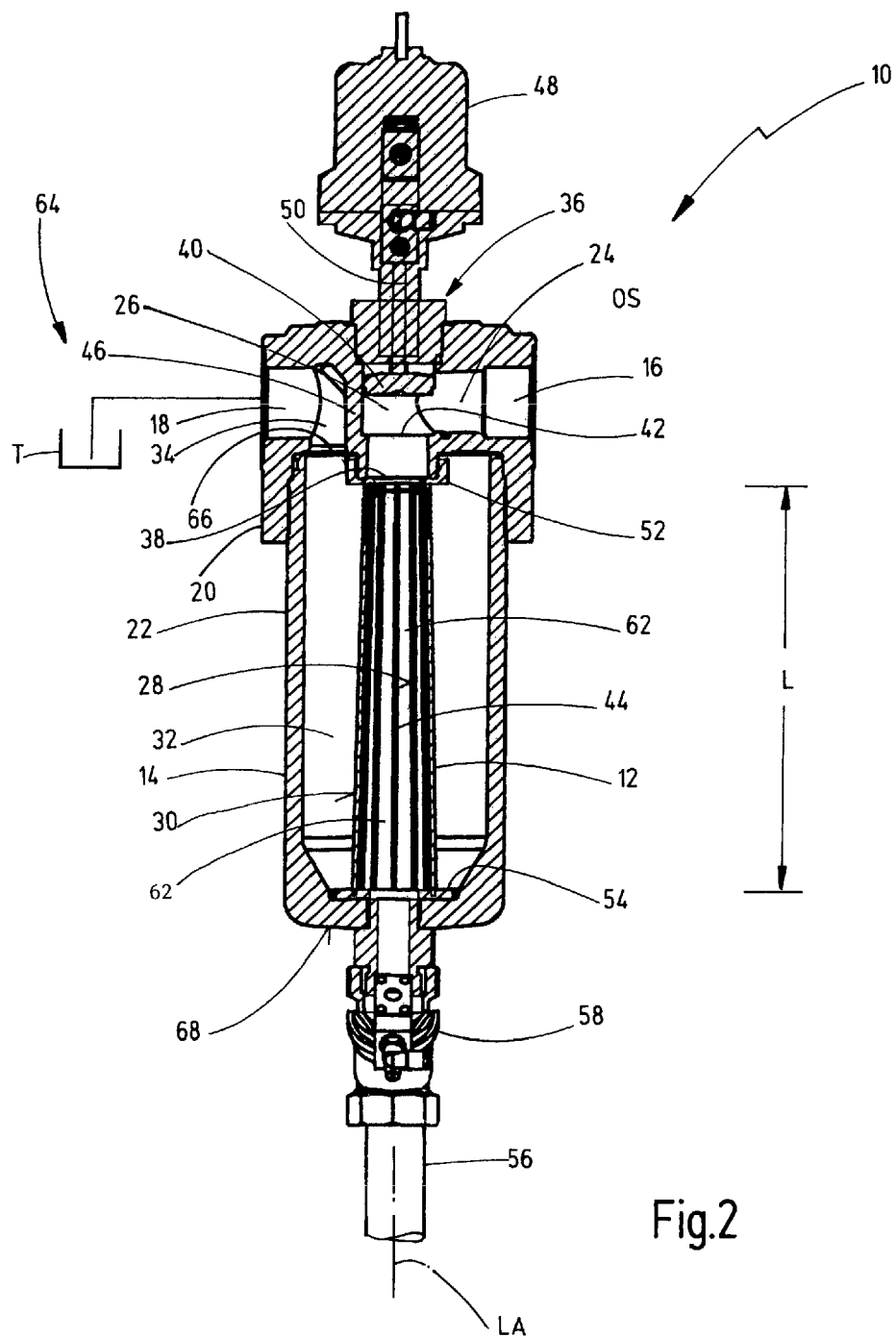
FIG. 2 is a side view in section through the filter device according to FIG. 1.

FIGS. 1 and 2 show a filter device 10 according to an exemplary embodiment of the invention with a filter element 12. The filter element 12 is accommodated in a filter housing 14 with fluid connection points 16, 18 for non-filtrate or filtrate. The fluid connection points 16, 18 are connected to one another in a fluid-conveying manner by the filter element 12. The filter housing 14 has a head piece 20 and a pot-shaped receiving part 22. The head piece 20 has the fluid connection points 16, 18 for non-filtrate and filtrate. From the fluid connection point 16 for the non-filtrate, the non-filtrate is guided along a first fluid-conveying path 24 towards the inside of the filter element 12. This first fluid-conveying path 24 extends at a right angle at a diversion 26. The fluid then flows during the filtration operation through the filter element 12 from the inside to the outside.

Contamination, in particular particles, attaches to the inner side 28 of the filter element 12. On the outer side 30 of the filter element 12 is the filtrate compartment or the filtrate side 32, which is connected by another fluid-conveying path 34 to the fluid connection point 18 in the filter housing 14 for the removal of the filtrate from the device.

The filter element 12 is formed conical. In particular, the filter element 12 is formed as a slotted sieve tube, preferably with a filter fineness of 30 μm to 3000 μm. The filter element 12 can however also be a multilayer wire mesh, in particular a three-layer wire mesh, which is preferably sintered. Such a filter element 12 usually has a filter fineness of 25 μm to 100 μm. Such filter elements 12 are generally produced from stainless steel, and their use in such filtration tasks is standard, so that their construction shall not be addressed in greater detail. The filter element 12 is accommodated in the pot-shaped receiving part 22 of the filter housing 14 in such a way that, with increasing tapering of the filter element 12, the filtrate compartment 32 formed in the receiving part 22 and surrounding the filter element 12 widens in an upwards direction in cross section viewed in the direction of FIG. 2.

According to the invention, the filter device 10 is formed as a single filter element solution. In a predefinable changeover and in a consecutive time period, this single filter element 12 can be used for filtration or can be backwashed by using the pressure control or pressure control device 36. Depending on the quantity of the particle contamination present in the fluid and to be cleaned by the filter element, the filtration operation nevertheless takes more time than the respective backwashing operation. In the filtration operation itself, the particle contamination often attaches to the inner side 28 of the filter element 12. This situation leads to an increasing pressure difference between the fluid connection points 16, 18. A backwashing can then be automatically triggered when a predetermined pressure difference is exceeded, in that such a backwashing operation is triggered by a differential pressure measuring device (not depicted or described in greater detail). The backwashing can also be triggered in a time-controlled or manual manner. The filter element 12 can thus be flowed through in both directions for a filtration of the non-filtrate or for a backwashing for cleaning particle contamination. In addition, the filter device 10 has a pressure control device 36, which activates the backwashing operation and by which a post-suctioning effect is generated to improve the cleaning of particle contamination on the filter element 12 to be backwashed.

The first fluid-conveying path 24 can be partially or fully shut off between the fluid connection point 16 for non-filtrate and an input side 38 of the filter element 12 on its non-filtrate side by a displaceable blocking part 40 of the pressure control device 36. In a partially shut-off position, the blocking part 40 forms with its valve seat 42 a kind of nozzle or restriction point, by which the fluid flow of the non-filtrate is further accelerated towards the center 44 of the filter element 12 and, additionally, downwards when viewed in the direction of FIG. 2. This effect is supported by the downwards-widening output cone of the filter element 12. The blocking part 40 is formed plate-shaped or saucer-shaped to allow it to cover as large as possible an opening cross section on the input side 38 of the filter element 12. The blocking part 40 can be moved at the diversion 26 from out of a releasing opened position OS towards its blocking position along a guide 46 in the form of a vertically aligned wall. This guide 46 separates the fluid connection points 16, 18 for non-filtrate and filtrate on the head side of the filter housing 14 from one another. The blocking part 40 can be moved by a pneumatically-activatable working cylinder 48 mounted on the top side of the head piece 20 and by an axially displaceable piston rod or activating rod 50 between its starting position or opened position OS and its partially or fully shut-off positions, with the fully opened blocking part position being represented in FIG. 2.

The filter element 12 extends between two fluid-conveying receptacles 52, 54 inside the filter housing 14 and is connected to them in a pressure-tight manner at the respective receiving points. One receptacle 52 is connected to the first fluid-conveying path 24, and the other is connected to a second fluid-conveying path 56 in the form of a backwash line. The backwash line is led or extends out of the filter housing 14 and can be activated by a backwash valve 58, in particular a 2/2-way valve, by a pneumatically-activatable working cylinder 60. A third fluid-conveying path 62 extends in a straight line between the pressure control device 36 and the backwash valve 58, in particular along the longitudinal axis LA of the filter element 12. The pneumatic drive systems for the blocking part 40 and the valve 58 can also be replaced with an electric servomotor or an electrically-actuatable magnet device.

The combined volume, made up of the inside of the filter element 12 and the backwash line 56, is sufficiently large that, by a rapid displacement of the blocking part 40 of the pressure control device 36 into the blocking position, a pressure shock can be generated on the filter element 12 to effect the backwashing. The filter device is connected, as part of a hydraulic system 64, to a tank T by its fluid connection point 18 for the discharge of the filtrate. The tank serves as a storage device for additional hydraulic components connected to the tank T, such as mobile machine parts, for example, which components can still be supplied with fluid from the tank T, even when the filter device is in backwashing mode. A valve (not depicted) is advantageously connected between the tank T and the filter device, which valve cooperates with the pressure control device for an obvious operation and which is in any case also closed as part of the backwashing operation, to thus avoid an undesirable post-suctioning of air or residue from the tank T. The valve can also be arranged on the tank side or the device side, to define the backwash quantity on the filtrate side of the filter device, so that precisely portionable backwash quantities (packages) with a minimal input volume are available to the filter device, and can accordingly, in spite of their sometimes high viscosity, be significantly accelerated in a prompt manner for the backwash operation and with their total volume.

In filtration operation, the non-filtrate flows at the associated fluid connection point 16 into the head piece 20 of the filter device 10 and is diverted at the diversion 26 towards the inside of the filter element 12. The filter element 12 is flowed through with the fluid from the inside to the outside, with contamination being collected on the inner side 28 of the filter element 12. The filtrate side 32 is formed on the outer side 30 of the filter element 12, which filtrate side is connected by a corresponding opening 66 in the head piece 20 to the fluid connection point 18 for the filtrate.

In the method according to the invention for backwashing the filter element 12, the backwash valve 58 on the underside 68 of the filter device is opened to establish a fluid-conveying connection from the inside 44 of the filter element 12 to the backwash line 56. In this way, non-filtrate can still flow through the filter element 12 into the backwash line 56 along the thus formed fall line and can be accelerated in the axial direction. It cleans at least a portion of the particle contamination 72 from the inner wall of the filter element 12. To trigger further backwashing of the filter element 12, the blocking part 40 of the pressure control device 36 is then displaced into its blocking position. A stall of the fluid flow on the inside of the filter element 12 is then generated such that a suction effect is produced, which effect sucks filtrate 70 from the filtrate compartment 32 from the outside to the inside through the filter element 12 in a radial manner to remove the remaining particle contamination 72 from the filter element 12 (in this regard see also the schematic diagram according to FIG. 3).

Figure 3:
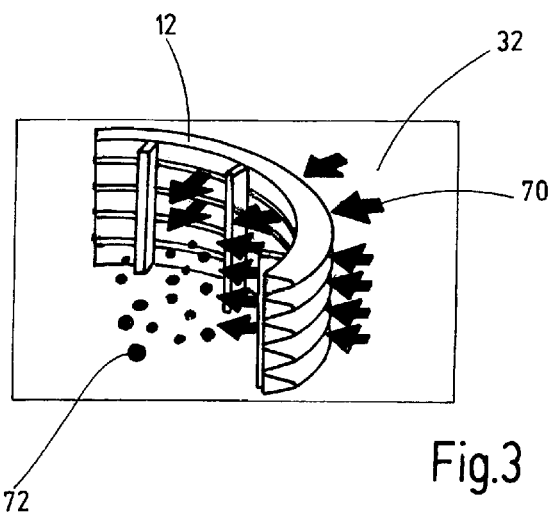
FIG. 3 is a partial perspective section of a filter element, schematically illustrating the effect of a backwashing operation.

FIG. 3 shows a section of a slotted sieve tube, which substantially forms the filter element 12. A wire is wound in an "endless" manner along tapered longitudinal rods, which face one another and which are arranged axially, and is firmly connected to the longitudinal rods. The tapered cross-sectional extension of the wire is tapered to the outside towards the filtrate side 32 in order to thus present low resistance for the fluid during filtration operation on the outflow side and to form on the inflow side in a widening manner and with the respective adjacent connecting wire coil narrowed passage gaps. The gaps prevent the particle contamination 72 from passing over to the clean side of the filter device. By contrast, in the backwashing operation, as is depicted in a schematic manner in FIG. 3, the wire coils arranged adjacent to one another thus form with their outwards-oriented conical cross-sectional tapering a conical outwards-widening intake funnel. The funnel permits an accelerated guiding of the fluid towards the free gap cross sections to thus carry out the particle contamination 72 accumulated there in the context of the previous filtration towards the inside 44 of the filter element 12 for the described output operation from the filter device with the filter element 12 at the bottom side.

Figure 4:
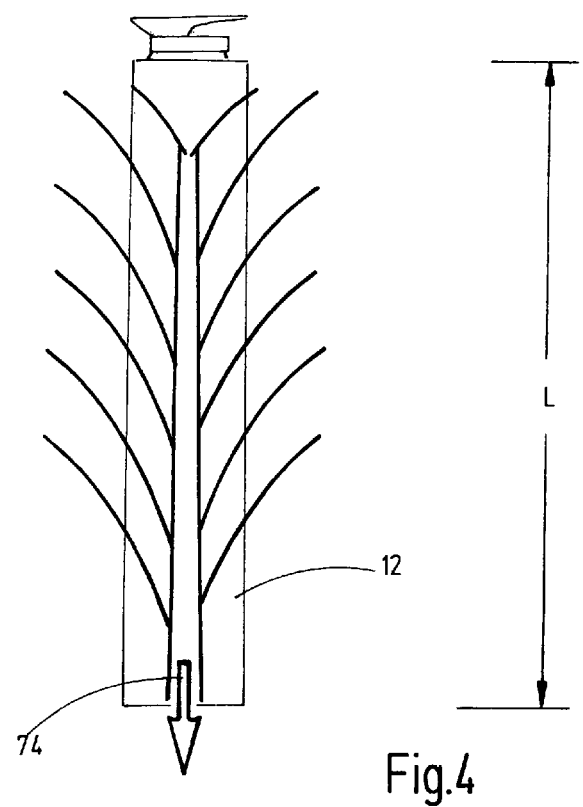
FIG. 4 is a schematic diagram of the isokinetic flow course forming in the filter element of FIG. 1 during backwashing.

During the backwashing, an isokinetic fluid flow course 74 is generally established on the inside 44 of the conical filter element 12 towards the backwash valve 58, in particular due to the conical slotted sieve tube construction, which is illustrated by the flow arrows shown in FIG. 4. Due to this isokinetic flow course 74, the backflowed filtrate on the inside of the filter element 12 has over its length l approximately the same flow energy. Due to the described acceleration effects, the flow velocity itself is able to increase even further in a downwards direction towards the opened backwash valve 58 and the fall line-shaped backwash line 56 connected thereto. To complete the backwash operation, the blocking part 40 is in any case again displaced back to its opened position OS depicted in FIG. 2 and the inside 44 of the filter element 12 is briefly rinsed with non-filtrate in order to "wash out" any remaining particle contamination 72 from the inside 44 of the filter element 12. Finally, the backwash valve 58 is closed again to place the filter device 10 in a state in which the normal filter operation can be resumed.

In this regard the blocking part 40 remaining, for a backwashing of the filter element 12, in the blocking position for a maximum of 2 seconds, preferably for a maximum of 1 second, still more preferably for a maximum of 0.5 seconds has proven to be particularly advantageous. This operation further enhances the backwashing effect.

The filter device 10 according to the invention has only a single filter element 12 and, for this reason alone, it is formed in a very compact and space-saving manner and also in a manner which can be realized cost-efficiently. The compact construction of the single filter element solution according to the invention permits retrofitting this solution in confined spaces and also in already installed machinery arrangements, such as machine tools, for example. In particular the machining of work pieces often involves significant particulate contamination 72 of lubricating-, cooling- and hydraulic fluids. These fluids can be reliably filtered off with the filter device 10, with the filter element 12 having a particularly long service life for actual filter operation due to time-based or demand-based backwashing. The separation rate is very high due to the use of proven-quality, tough filter element technology. In addition, a particularly high fluid pressure for the non-filtrate at the fluid connection point 16 is not required to be able to reliably filter the fluid and to trigger a backwashing. The only requirement is an input pressure of at least 0.7 bar (=70 kPa). The pressure loss in the filter device 10 is usually approx. 0.5 bar (=50 kPa). Another advantage can be seen in the fact that, due to the large cross sections of the fluid-conveying paths 24, 56, 62 in the filter device 10, the risk of an undesirable blocking for the filter element 12 is minimized in any operational state of the filter device.

The fluid volume, which is surrounded by the filter element 12 on the non-filtrate side, is approximately 0.3 to 0.6 liters, preferably approximately 0.4 liters. The volume only on the filtrate side inside the filter housing 14 is approximately 1 to 4 liters, preferably approximately 2 liters. The preferred volume ratio of the filter housing 14 to the filter element 12 is thus approximately 5:1. However, ratio values from 2:1 to 7:1 are also conceivable. The fluid volume in the inlet connection 16 and in the run-off region between the outlet of the filter element 12 and the valve 58 and thus on the non-filtrate side is approx. 0.1 to 0.4 liters, preferably approximately 0.2 liters. The fluid volume of the outlet connection 18 on the filtrate side is approximately 0.1 to 0.4 liters, preferably approximately 0.23 liters. Due to the volume ratio of approximately 5:1 of the filter housing 14 to the filter element 12, the afore-mentioned self-cleaning operations on the filter element 12 are established in the backwashing even in the case of highly viscous fluids. To determine the volume inside the filter housing 14 on the filtrate side, the possible total fluid volume inside the filter housing 14 is considered less the fluid quantity surrounded by the filter element 12.

While one embodiment has been chosen to illustrate the invention, it will be understood by those skilled in the art that various changes and modifications can be made therein without departing from the scope of the invention as defined in the claims.

The invention claimed is:

1. A filter device, comprising:
   a filter housing having a head piece with a non-filtrate fluid connection point and a filtrate connection point in said head piece at a first end of said filter housing and having a housing end member at an opposite second end of said filter housing, said housing end member having a backwash port therein;
   only a single filter element in said filter housing allowing fluid flow through said filter element in opposite first and second directions for selectively filtering the non-filtrate and for backwashing to clean particle contamination, respectively, said non-filtrate fluid connection point and said filtrate connection point being connected to one another in fluid communication via said filter element and being in direct fluid communication with an interior and an exterior, respectively, of said filter element via first and second fluid-conveying paths, respectively, said filter element extending continuously between and having first and second ends contacting said headpiece and said second end of said filter housing, respectively, said second end of said filter element having a backwash opening surrounding said backwash port and connecting said interior of said filter element in direct fluid communication with said backwash port without passing through said filter element between said interior thereof and said exterior thereof, a backwash line extending out of said filter housing from said backwash port and having a backwash valve therein;
   a pressure control in said filter housing generating a post-suctioning effect for improving cleaning of the particle contamination on said filter element during backwashing of said filter element; and
   a displaceable blocking part of said pressure control, being movable between an open position and a closed position allowing and blocking fluid communication between said non-filtrate connection point and said interior of said filter element, respectively, providing a capability of said filter element being backwashed by both unfiltrate and filtrate fluids in the open position.

2. The filter device according to claim 1 wherein said blocking part forms with a valve seat in said head piece a nozzle in a partial shut-off position of said blocking part that accelerates non-filtrate fluid flow inside of said filter element.

3. The filter device according to claim 1 wherein said backwash valve is a 2/2-way valve.

4. The filter device according to claim 1 wherein said pressure control, said interior of said filter element, said backwash line and said backwash valve are in a straight line.

5. The filter device according to claim 4 wherein said straight line is along a longitudinal axis of said filter element.

6. The filter device according to claim 1 wherein a combined volume of said interior of said filter element and of said backwash line is sufficiently large that a pressure shock is capable of being generated on said filter element for backwashing by displacement of said blocking point into a closed position from an opened position of said blocking part.

7. The filter device according to claim 1 wherein said filter element is conical and is received in a pot-shaped receiving part of said filter housing, a filtrate receiving compartment between said pot-shaped receiving part and said filter element widening due to tapering of said filter element.

8. The filter device according to claim 7 wherein said filter element comprises a slotted sieve tube.

9. The filter device according to claim 7 wherein an isokinetic flow course is established between said interior of said filter element towards said backwash valve.

10. The filter device according to claim 1 wherein said pressure control comprises a drive moving said blocking part between an opened position and a closed position.

11. The filter device according to claim 10 wherein said drive comprises a pneumatically-activatable working cylinder.

12. The filter device according to claim 1 wherein said first fluid-conveying path extends through an angle at a diversion; and
    said blocking part is movable along and contacts a guide wall being between and separating said non-filtrate connection point from said filtrate connection point.

13. The filter device according to claim 12 wherein said angle is a right angle.

14. The filter device according to claim 12 wherein said guide wall extends parallel to a longitudinal axis of said filter element and at an angle to said non-filtrate and said filtrate connection points.

15. The filter device according to claim 12 wherein said blocking part constantly contacts said guide wall during the movement of said blocking part between the open position and the closed positon at locations of said guide wall spaced from a valve seat releasably engaged with said blocking part.

16. The filter device according to claim 12 wherein said non-filtrate connection point and said filtrate connection point comprise openings extending coaxially through said filter housing along an opening axis; and
    said guide wall extends perpendicular to said opening axis and is coaxially aligned with and between said openings along said opening axis.

17. The filter device according to claim 16 wherein said blocking part is plate-shaped with a side edge engaging said guide wall.

18. A hydraulic system, comprising:
a filter housing having a head piece with a non-filtrate fluid connection point and a filtrate connection point in said head piece at a first end of said filter housing and having a housing end member at an opposite second end of said filter housing, said housing end member having a backwash port therein;
only a single filter element in said filter housing allowing fluid flow through said filter element in opposite first and second directions for selectively filtering the non-filtrate and for backwashing to clean particle contamination, respectively, said non-filtrate fluid connection point and said filtrate connection point being connected to one another in fluid communication via said filter element and being in direct fluid communication with an interior and an exterior, respectively, of said filter element via first and second fluid-conveying paths, respectively, said filter element extending continuously between and having first and second ends contacting said headpiece and said second end of said filter housing, respectively, said second end of said filter element having a backwash opening surrounding said backwash port and connecting said interior of said filter element in direct fluid communication with said backwash port without passing through said filter element between said interior and said exterior thereof, a backwash line extending out of said filter housing from said backwash port and having a backwash valve therein;
a pressure control in said filter housing generating a post-suctioning effect for improving cleaning of the particle contamination on said filter element during backwashing of said filter element; and
a displaceable blocking part of said pressure control, being movable between an open position and a closed position allowing and blocking fluid communication between said non-filtrate connection point and said interior of said filter element, respectively, providing a capability of said filter element being backwashed by both unfiltrate and filtrate fluids in the open position; and
a tank connected in fluid communication with said filtrate connection point.

19. The hydraulic system of claim 18 wherein
said first fluid-conveying path extends through an angle at a diversion; and
said blocking part is movable along and contacts a guide wall being between and separating said non-filtrate connection point from said filtrate connection point.

20. The hydraulic system according to claim 19 wherein
said non-filtrate connection point and said filtrate connection point comprise openings extending coaxially through said filter housing along an opening axis; and
said guide wall extends perpendicular to said opening axis and is coaxially aligned with and between said openings along said opening axis.

21. The hydraulic system according to claim 20 wherein
said blocking part is plate-shaped with a side edge engaging said guide wall.

22. The hydraulic system device according to claim 19 wherein
said blocking part constantly contacts said guide wall during the movement of said blocking part between the open position and the closed positon at locations of said guide wall spaced from a valve seat releasably engaged with said blocking part.

23. A method of backwashing a filter device, the method comprising the steps of
providing a filter device including a filter housing having a head piece with a non-filtrate fluid connection point and a filtrate connection point in the head piece at a first end of the filter housing and having a housing end member at an opposite second end of the filter housing, the housing end member having a backwash port therein, only a single filter element in the filter housing allowing fluid flow through the filter element in opposite first and second directions for selectively filtering the non-filtrate and for backwashing to clean particle contamination, respectively, the non-filtrate fluid connection point and the filtrate connection point being connected to one another in fluid communication via the filter element and being in direct fluid communication with an interior and an exterior, respectively, of the filter element via first and second fluid-conveying paths, respectively, the filter element extending continuously between and having first and second ends contacting the headpiece and the second end of the filter housing, respectively, the second end of the filter element having a backwash opening surrounding the backwash port and connecting the interior of the filter element in direct fluid communication with the backwash port without passing through the filter element between the interior thereof and exterior thereof, a backwash line extending out of the filter housing from the backwash port and having a backwash valve therein, a pressure control in the filter housing generating a post-suctioning effect for improving cleaning of the particle contamination on the filter element during backwashing of the filter element, a displaceable blocking part of the pressure control, being movable between an open position and a closed position allowing and blocking fluid communication between the non-filtrate connection point and the interior of the filter element, respectively, providing a capability of the filter element being backwashed by both unfiltrate and filtrate fluids in the open position;
opening the backwash valve connected to the filter housing to connect in direct fluid communication an inside of the filter element with a backwash line without passing through the filter element between the interior and the exterior of the filter element;
allowing non-filtrate to flow from the non-filtrate connection point through the inside of the filter element into the backwash line;
displacing a blocking part of a pressure control into a blocking position to stall flow of the non-filtrate into the inside of the filter element and to produce a suction effect sucking filtrate from a filtrate compartment between the filter element and the filter housing into the inside of the filter element, the blocking part remaining in the blocking position for a maximum of two seconds;
displacing the blocking part into an opened position to flush the inside of the filter element with filtrate and the non-filtrate at a diversion in a fluid-conveying path extending between the non-filtrate connection point and an input-side of the filter element; and
closing the backwash valve.

24. The method according to claim 23 wherein
the blocking part remains in the blocking position for a maximum of one second.

25. The method according to claim 23 wherein
the blocking part remains in the blocking position for a maximum of 0.5 seconds.

26. The method according to claim 23 wherein
the blocking part is guided by and engages a guide wall separating the non-filtrate connecting point from the filtrate connecting point during movement of the blocking part.

27. The method according to claim 26 wherein
said non-filtrate connection point and said filtrate connection point comprise openings extending coaxially through said filter housing along an opening axis; and
said guide wall extends perpendicular to said opening axis and is coaxially aligned with and between said openings along said opening axis.

28. The method according to claim 27 wherein
said blocking part is plate-shaped with a side edge engaging said guide wall.

29. The method according to claim 26 wherein
the blocking part continually contacts the guide wall during the movement of the blocking part between the open position and the closed position at locations of the guide wall spaced from a valve seat releasably engaged with the blocking part.

\* \* \* \* \*